United States Patent Office 3,407,138
Patented Oct. 22, 1968

3,407,138
METHOD AND COMPOSITION FOR EXTINGUISHING AND PREVENTING FIRES IN FLAMMABLE LIQUIDS
Billy Gene Harper, Brazoria, Robert Niles Bashaw, Freeport, and Bernis L. Self, Lake Jackson, Tex., assignors to The Dow Chemical Company, Midland, Mich., a corporation of Delaware
No Drawing. Filed Sept. 2, 1964, Ser. No. 394,070
18 Claims. (Cl. 252—2)

ABSTRACT OF THE DISCLOSURE

The disclosure herein concerns a method and compositions for extinguishing and for preventing fire in flammable liquids. For such purposes, compositions consisting essentially of water-insoluble, water-swollen gelled polymer particles having a density of less than that of the flammable liquid are used. They are adjusted to have a density less than that of the flammable liquid by the inclusion of a lightweight substance, and preferably with the inclusion of an adhesive to promote adhesion between such light-weight substance and the water-swollen polymer particles.

---

This invention concerns a method and a composition for extinguishing and for preventing fires in flammable liquids. More particularly, the invention concerns compositions of water-insoluble but water-swollen particulate gelled polymers having a density lighter than that of the flammable liquids, and their use thereupon as a heat dissipating smothering blanket for extinguishing and for preventing fires in flammable liquids.

It is known to use foams in fire fighting, which foams have high expansion and good blanketing ability. Such foams, however, lose water readily and are dissipated or decomposed so rapidly that their cooling capacity is low.

It has now been discovered that low density water-insoluble but water-swellable particulate-gel-forming polymeric compositions can be prepared which, when gelled, contain a high proportion of water yet are light enough to float on a surface of a flammable liquid, whereby fires in flammable liquids can be extinguished and prevented The compositions of this invention comprise (1) at least one water-insoluble but water-swellable particulate-gel-forming polymer in which is dispersed (2) a light-weight organic or inorganic substance in amount sufficient to give a water-swollen gelled composition when mixed with water, which gelled composition has a density lower than that of the flammable liquid, i.e., less than one gram per ml. and advantageously between 0.1 and 0.95 gram per ml. so that it floats on the surface of said flammable liquid and can be used to extinguish fires therein.

A preferred composition also comprises a water-insoluble or substantially water-insoluble adhesive, advantageously an adhesive resinous polymer, which keeps the light-weight organic or inorganic substanace adhered to the water-swellable and water-swollen polymer.

The water-insoluble but water-swellable particulate gel-forming polymers useful in the compositions and method of this invention include cross-linked species of a polymer whose linear analog is water-soluble. Typical of such materials are cross-linked monovalent cation salts of polyacrylic, polymethacrylic, polysulfoethyl acrylic and polysulfoethyl methacrylic acids. Other typical examples include cross-linked polyglycols having average molecular weights of from about 1,000 up to a million or more; cross-linked substantially water-insoluble, water swellable sulfonated alkaryl and aromatic polymers, such as, for example, cross-linked poly(sodium styrenesulfonate) and sulfonated polyvinyltoluene salts; copolymers of such sulfonated alkaryl and aromatic materials with acrylonitrile, alkyl acrylonitriles, acrylates and methacrylates; cross-linked polyvinyl alcohol and polyacrylamide and cross-linked copolymers of a polyacrylamide as, for example the cross-linked copolymer of acrylamide and/or methacrylamide and acrylic and/or methacrylic acid and of acrylamide, and/or methacrylamide and the monovalent salts of acrylic and/or methacrylic acid; cross-linked polymers of heterocyclic monomers, such as polyvinyl morpholinone, poly-5-methyl-N-vinyl-2-oxazolidinone and polyvinyl pyrrolidone. Other water-swellable but water-insoluble polymers or copolymers can also be employed.

Such materials as the above-named polymers can be made by a variety of known methods. For example, the substantially water-insoluble, water-swellable, cross-linked polyacrylate salts may be prepared by chemical cross-linking as shown in British Patent 719,330 or, alternatively, by subjecting a mixture of a monovalent cation salt of acrylic acid and water to the influences of high energy ionizing radiation for a period of time sufficient to effect the desired polymerization and the cross-linking of at least a portion of the polymer produced as in U.S. Patent 3,090,736. In the latter instance, the amount of ionizing radiation should be at least about 0.5 megarad, but greater or lesser amounts may be employed. In any event, the amount of radiation must be great enough to give a swellable polymer which takes in water and, in so doing, increases in volume but generally retains its original shape. With this class of polymeric materials, it is critical to the method of the present invention that the salt-forming cation be monovalent. Representative examples of monovalent cations include, for example, the alkali metals, that is, sodium, potassium, lithium, rubidium, and cesium, as well as water-soluble ammonium and ammonium-like radicals based upon the quaternary nitrogen atom.

Other methods for preparing such cross-linked materials may be found in U.S. Patent 2,810,716, issued Oct. 22, 1957, to Markus. The acrylamide polymers and copolymers may be chemically cross-linked with methylenebisacrylamide as the cross-linker as well as with the materials disclosed in that patent.

The light-weight organic or inorganic substances effective in the compositions and method of this invention include, broadly, any organic or inorganic compounds or compositions which are non-reactive with water so as not to vitiate their physical property of giving a mixture with any of the aqueous gelled polymers having a density less than that of the flammable liquid on which they are to be floated, i.e., a density of less than one gram per ml.

While such compounds and compositions are preferably non-flammable per se, normally flammable compounds and compositions, e.g., expanded graphite and powdered resinous polymeric methylmethacrylate can be used, since the large proportion of water in the gelled compositions of which they are a part suffices to cool and extinguish the flame of the burning flammable liquid before such substances ignite. Of these light-weight substances, expanded perlitic minerals such as expanded obsidian perlite, pitchstone, vitrophyre, tachylite, pumice, vitric or glass tuff and other minerals of a glassy nature containing at least one percent of bound water, but generally about 2 to 6 percent bound water, which minerals are expanded by heating under suitable conditions to form cellular particles, are preferred. These cellular materials have a bulk density of 1.5 lb./cu. ft., but generally between 2 and 10 lb./cu. ft. The amount of light-weight substance used in the compositions herein is dependent upon its mesh size and density.

Any water-insoluble or substantially water-insoluble adhesive can be used in amount sufficient to coat the particles of the light-weight substances, thereby causing the water-swellable and water-swollen gelled polymer and light-weight substance to adhere to one another. The amount of such adhesive required will vary with the amount and kind of light-weight substance used in a given gelled composition, with the kind and amount of water-swellable and swollen gelled polymer and with the kind of adhesive. A simple trial or series of trials will suffice to determine the amount of adhesive to be used sufficient to cause the gelled polymer to adhere to the light-weight substance. Effective adhesives include water-insoluble resinous polymers such as phenol-aldehyde resins, alkyd resins, e.g., glyceryl phthalate resins, amine-aldehyde resins, e.g., urea-formaldehyde resins, diolefinic resins, e.g., polybutadiene resins, coumarone-indene resins, vinyl and vinylidene halide polymers, styrene polymers and copolymers of styrene with ethylenic unsaturated monomers which are copolymerizable with styrene, acrylate and methacrylate polymers, terpene polymers, epoxy resins and the like.

In practice, the compositions of this invention are prepared by mixing particles of a light-weight substance, as described above, with a water-gellable polymer, as described above, and adding sufficient water to give a water-gelled light-weight composition, i.e., having a density less than one gram per ml. If desired, there can be added a conventional surface active agent to facilitate dispersion of the light-weight substance in the water-gellable polymer. A simple test suffices to determine the amount of surfactant required. The preferred compositions are prepared by mixing water-insoluble or substantially water-insoluble adhesive with sufficient light-weight substance, e.g., expanded perlite, to coat the particles thereof, thereby giving a tacky composition, which is then mixed with the water-swellable and gellable polymer. The resulting composition is then mixed with water to form a gel which will float on the surface of the flammable liquid. Alternatively, the mixture of the adhesive and light-weight substance are mixed into the water-gelled polymer.

The quantity of water-swellable polymer required in the composition depends on the gel capacity and mesh size of the water-swellable polymer. The gel capacity is determined by dispersing a given weight of dry polymer particles in an amount of water in excess of that required to completely swell the polymer particles. The free water is then drained from the gelled polymer particles and the weight of the gelled resin particles is then determined. The quotient of the weight of the completely gelled particles divided by the initial weight of the dry polymer particles is the gel capacity. The water-insoluble but water-swellable polymers useful in the compositions of this invention have a gel capacity of at least 20 and preferably at least 100 or more.

The gelled compositions of this invention are used by pumping them onto the surface of a burning flammable liquid on which they float. They extinguish the fire both by temperature reduction, achieved by evaporation of water therefrom, and by smothering the flames by excluding air therefrom. The compositions can also be floated on top of the flammable liquid in order to prevent fires.

The following examples describe completely representative specific embodiments and the best mode contemplated by the inventors of carrying out the invention. They are not to be taken as limiting the invention other than as defined in the claims.

Example 1

Coarse ground expanded perlite (1000 ml.) having a density of 0.08 g./ml. was mixed in an electric kitchen blender with a mixture of 10 g. epoxy resin (Bisphenol A-epichlorohydrin), 1 g. diethylene triamine and sufficient methyl ethyl ketone (MEK) to make a mixture of 50 ml. volume.

The MEK evaporated as the resin polymerized. When the perlite surface was tacky, 0.5 gram of a cross-linked copolymer of acrylamide and potassium acrylate, having a gel capacity of 1000 was added while blending was continued. The material was placed in an oven and cured at 100° C. overnight. Ten grams of the resultant granular material was mixed with water for one minute and then poured into a tared conical screen (60 mesh). Twenty-eight and two-tenths grams of gelled product was held on the screen (product had a density of about 0.25 g./ml.). This product readily floated on hydrocarbons (i.e., benzene kerosene, gasoline, etc.). As a result of this floating, gelled mass, these hydrocarbons could not be ignited with a match. When these hydrocarbons were ignited prior to floating the gelled mass on the hydrocarbon surface, the flames were readily extinguished.

Example 2

Example 1 was repeated using 1.0 gram of copolymer. A product having a density of 0.33 g./ml. was obtained having similar fire-protective and fire-extinguishing properties.

Example 3

Example 1 was repeated using 2 grams of copolymer. A gelled product having a density of about 0.5 g./ml. was obtained. It floated on hexane and prevented ignition thereof. When 3 grams of copolymer was used, the gelled product had a density of about 0.6 g./ml. Results were about the same. When 4.5 grams of copolymer was used, a gelled product having a density of about 0.8 was obtained. This product sank in hexane, showing that the limit is about 3 to 4 grams of this copolymer when hexane is to be protected from fire.

Example 4

Various kinds of particles of light-weight floatable materials were tried for the purpose of floating the water-gelled copolymer of Example 1 on lighter-than-water flammable liquids. Table I shows the results.

TABLE I (In Table I, 1000 ml. of light-weight floatable material was used in admixture with 1 g. of water-swellable polymer and 500 ml. of water. No adhesive was used.)

| Floatable Material | Result |
|---|---|
| (1) Polymethylmethacrylate | Floated on gasoline |
| (2) Expanded graphite | Do. |
| (3) Vermiculite | Do. |
| (4) Urea-formaldehyde micro balloons[1] | Do. |
| (5) Hollow glass spheres[1] | Do. |
| (6) Urethane foam dust[1] | Do. |
| (7) Foamed polystyrene beads[1] | Do. |

[1] Prior to gelling, 0.7 g. of sodium lauryl sulfate was mixed into the water-swellable composition.

Example 5

The procedure of Example 2 was repeated, except that prior to gelling, the perlite-polymer composition was mixed with 0.7 g. of sodium lauryl sulfate. This had the effect of holding the perlite-polymer granules together to form a more coherent coating on the surface of the flammable liquids.

What is claimed is:

1. Method for extinguishing fire in, and preventing the ignition of, a body of flammable liquid, which comprises applying thereto in amount at least sufficient to cover the surface thereof a floatable composition of water-swollen gelled particles of a water-insoluble water-swellable cross-linked polymer having a gel capacity of at least 20 containing dispersed throughout said water-swollen gelled particles of a light-weight substance selected from the group consisting of vitreous minerals, polymeric methyl methacrylate, expanded graphites, urea-formaldehydes, urethanes and polystyrenes unreactive with water and having a density less than 1 gram per ml. in amount sufficient to give a composition which floats on said flammable liquid.

2. Method of claim 1 wherein the particles of lightweight substance are coated with a water-insoluble or substantially water-insoluble adhesive which promotes adhesion therebetween and the water-swollen gelled polymer.

3. Method of claim 1 wherein the polymer is a cross-linked copolymer of acrylamide and potassium acrylate having a gel capacity of 1000.

4. Method of claim 1 wherein the light-weight substance consists of particles of expanded perlite.

5. Method of claim 1 wherein the light-weight substance is coated with epoxy resin.

6. Method of claim 1 wherein the polymer is a cross-linked copolymer of acrylamide and potassium acrylate having a gel capacity of 1000, and the light-weight substance consists of particles of expanded perlite coated with an epoxy resin.

7. A composition suitable for fighting fire in a flammable liquid which consists essentially of particles of a cross-linked water-insoluble water-swellable gel-forming polymer having a gel capacity of at least 20 in admixture with particles of a light-weight substance selected from the group consisting of vitreous minerals, polymeric methyl methacrylate, expanded graphites, urea-formaldehydes, urethanes and polystyrenes which is not reactive with water and which has a density less than 1 gram per ml. in amount sufficient to give a composition which, when swollen with water to form an aqueous gel, will float on the surface of a flammable liquid.

8. The composition of claim 7 wherein the particles of light-weight substance are coated with an adhesive which promotes adhesion therebetween and the polymer particles when the latter are in a water-swollen gelled state.

9. The composition of claim 7 wherein the polymer is a cross-linked copolymer of acrylamide and potassium acrylate having a gel capacity of 1000.

10. The composition of claim 7 wherein the light-weight substance consists of particles of expanded perlite.

11. The composition of claim 7 wherein the light-weight substance is coated with an epoxy resin.

12. The composition of claim 7 wherein the polymer is a cross-linked copolymer of acrylamide and potassium acrylate having a gel capacity of 1000 and the light-weight substance consists of particles of expanded perlite coated with an epoxy resin.

13. A composition suitable for fighting fire in a flammable liquid which consists essentially of particles of a cross-linked water-insoluble water-swollen gelled polymer having a gel capacity of at least 20 in admixture with particles of a light-weight substance selected from the group consisting of vitreous minerals, polymeric methyl methacrylate, expanded graphites, urea-formaldehydes, urethanes and polystyrenes which is not reactive with water and which has a density less than 1 gram per ml. in amount sufficient to give a composition which will float on the surface of a flammable liquid.

14. The composition of claim 13 wherein the particles of light-weight substance are coated with a water-insoluble or substantially water-insoluble adhesive which promotes adhesion therebetween and the polymer particles when the latter are in a water-swollen gelled state.

15. The composition of claim 13 wherein the polymer is a cross-linked copolymer of acrylamide and potassium acrylate having a gel capacity of 1000.

16. The composition of claim 13 wherein the light-weight substance consists of particles of expanded perlite.

17. The composition of claim 13 wherein the light-weight substance is coated with an epoxy resin.

18. The composition of claim 13 wherein the polymer is a cross-linked copolymer of acrylamide and potassium acrylate having a gel capacity of 1000 and the light-weight substance consists of particles of expanded perlite coated with an epoxy resin.

References Cited

UNITED STATES PATENTS

| | | | |
|---|---|---|---|
| 3,229,769 | 1/1966 | Bashaw et al. | 169—1 |
| 3,238,129 | 3/1966 | Veltman | 252—7 |
| 3,090,736 | 5/1963 | Bashaw et al. | 204—159.14 |
| 3,093,619 | 6/1963 | Taylor et al. | 252—2 XR |

FOREIGN PATENTS

| | | |
|---|---|---|
| 625,051 | 8/1961 | Canada. |
| 666,492 | 7/1963 | Canada. |

OTHER REFERENCES

Rose et al., "The Condensed Chemical Dictionary" 1961, 6th Ed., p. 867.

LEON D. ROSDOL, *Primary Examiner.*

M. WEINBLATT, *Assistant Examiner.*